United States Patent
Esselbrugge et al.

(10) Patent No.: US 10,774,949 B2
(45) Date of Patent: Sep. 15, 2020

(54) VIV SUPPRESSION STRAKE ASSEMBLY

(71) Applicant: BLUEMARINE OFFSHORE YARD SERVICE B.V., Rotterdam (NL)

(72) Inventors: Martin Esselbrugge, Enschede (NL); André Luur Jan Steenhuis, Berkel en Rodenrijs (NL)

(73) Assignee: BLUEMARINE OFFSHORE YARD SERVICE B.V., Rotterdam (NL)

( * ) Notice: Subject to any disclaimer, the term of this patent is extended or adjusted under 35 U.S.C. 154(b) by 0 days.

(21) Appl. No.: 16/618,829

(22) PCT Filed: Jun. 15, 2018

(86) PCT No.: PCT/NL2018/050394
§ 371 (c)(1),
(2) Date: Dec. 3, 2019

(87) PCT Pub. No.: WO2018/231061
PCT Pub. Date: Dec. 20, 2018

(65) Prior Publication Data
US 2020/0141517 A1    May 7, 2020

(30) Foreign Application Priority Data
Jun. 15, 2017 (NL) .................................... 2019077

(51) Int. Cl.
*F16L 1/12* (2006.01)
*E02B 17/00* (2006.01)
*F15D 1/12* (2006.01)

(52) U.S. Cl.
CPC .......... *F16L 1/123* (2013.01); *E02B 17/0017* (2013.01); *F15D 1/12* (2013.01)

(58) Field of Classification Search
CPC ...... F16L 1/123; F15D 1/12; B63B 2021/504; E02B 17/0017
See application file for complete search history.

(56) References Cited

U.S. PATENT DOCUMENTS 4,722,367 A * 2/1988 Swink ................... F15D 1/10
138/178
6,896,447 B1 * 5/2005 Taquino ................. E21B 17/01
405/216

(Continued)

FOREIGN PATENT DOCUMENTS

| WO | 2004009949 A1 | 1/2004 |
| WO | 2004020777 A1 | 3/2004 |

(Continued)

OTHER PUBLICATIONS

International Search Report and Written Opinion for the International Patent Application No. PCT/NL2018/050394, dated Sep. 26, 2018, 11 pages.

*Primary Examiner* — Carib A Oquendo

(57) ABSTRACT

Vortex Induced Vibration (VIV) suppression strakes, in particular VIV suppression strakes are arranged on subsea pipelines. A VIV suppression strake assembly includes a strake fin support shell that is configured to be arranged against the outer surface of a section of pipe and at least one strake fin having a fin tip and a fin base. The strake fin support shell includes an aperture that is configured for inserting the fin therein, and the fin is provided at the fin base with an anchor, which anchor is configured for engaging the fin support shell on the pipe side of the aperture. The aperture is a slot dimensioned to allow the fin to be inserted in the slot from the pipe side of the slot with the fin tip leading until the fin base engages the shell.

20 Claims, 6 Drawing Sheets

(56) References Cited

U.S. PATENT DOCUMENTS

| | | | |
|---|---|---|---|
| 8,256,993 B2* | 9/2012 | Branchut | F16L 1/123 |
| | | | 405/224.2 |
| 10,344,785 B1* | 7/2019 | Allen | F15D 1/10 |
| 2005/0201832 A1 | 9/2005 | Edfeldt | |
| 2006/0153642 A1* | 7/2006 | Esselbrugge | B63B 21/502 |
| | | | 405/216 |
| 2006/0159522 A1* | 7/2006 | Edfeldt | F16L 1/123 |
| | | | 405/159 |
| 2007/0104542 A1* | 5/2007 | Somerville | E21B 17/01 |
| | | | 405/224.1 |

FOREIGN PATENT DOCUMENTS

| | | | |
|---|---|---|---|
| WO | 2007027087 | A1 | 3/2007 |
| WO | 2013140179 | A2 | 9/2013 |

\* cited by examiner

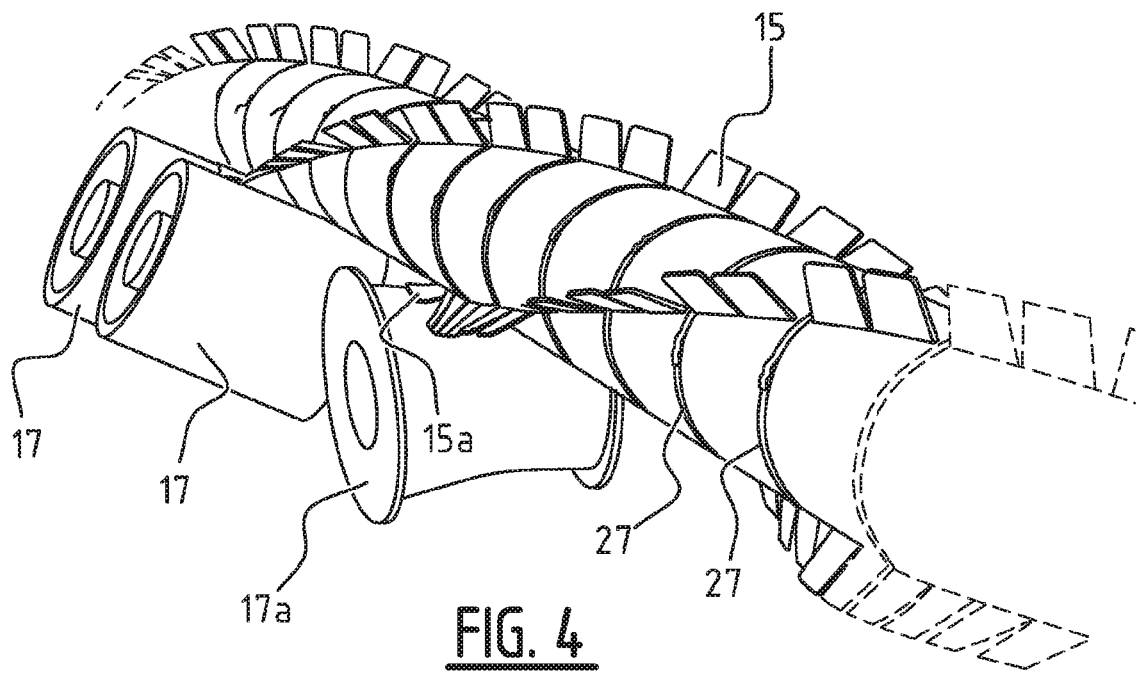
FIG. 4
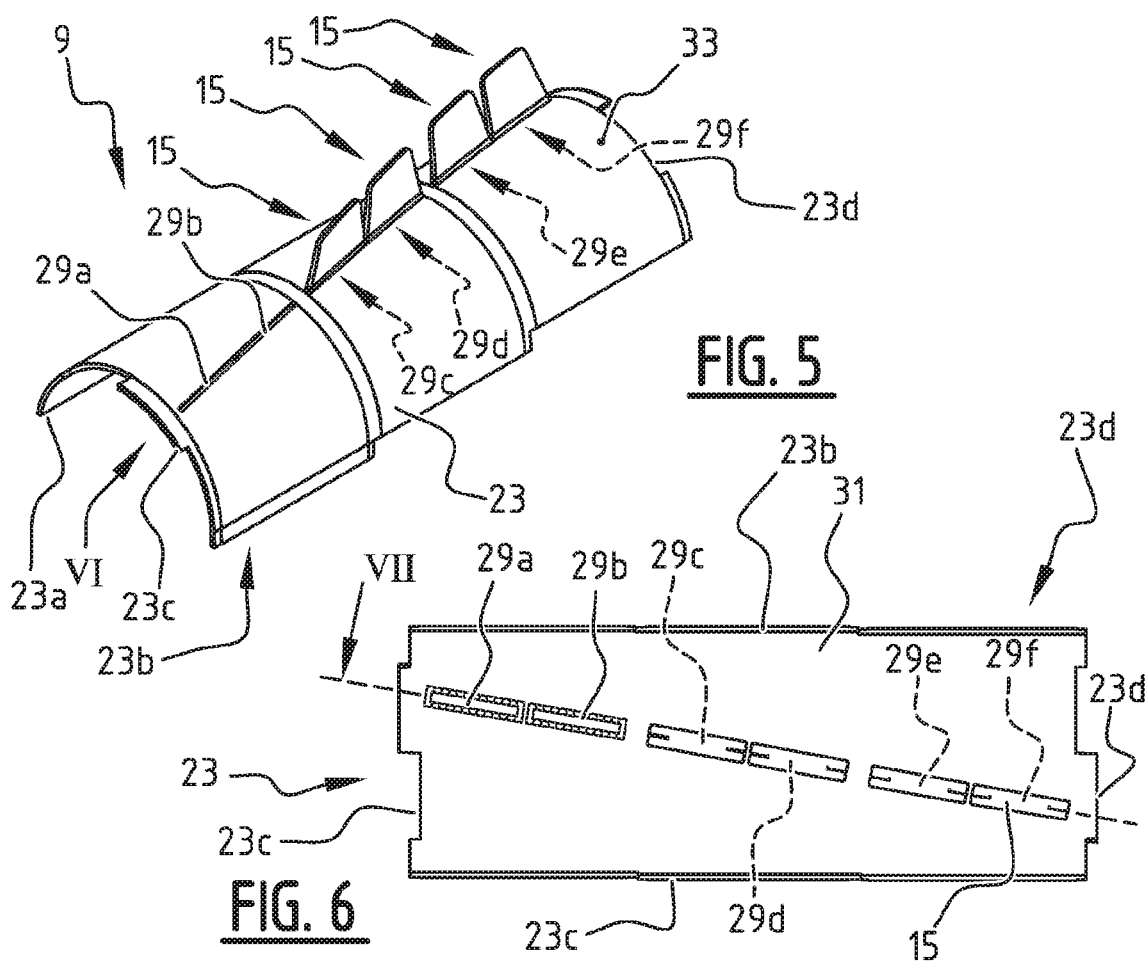
FIG. 5
FIG. 6

VIV SUPPRESSION STRAKE ASSEMBLY

This is a national stage application filed under 35 U.S.C. § 371 of international application PCT/NL2018/050394 filed Jun. 15, 2018, which claims priority to Netherlands Patent application NL2019077, filed Jun. 15, 2017, the entirety of which applications are hereby incorporated by reference herein.

The present invention relates to Vortex Induced Vibration (VIV) suppression strakes, in particular VIV suppression strakes that are arranged on subsea pipelines.

A cylindrical body that interacts with an external fluid flow, such as a subsea pipeline that interacts with sea current, produces vortices that travel downstream with the fluid flow. In particular, so-called Von Karman vortex streets are produced, that are the result of vortices being shed from alternating sides of the cylindrical body. When a single vortex is shed, an asymmetrical flow pattern forms around the cylindrical body and changes the pressure distribution. This means that the alternate shedding of vortices can create periodic lateral forces on the cylindrical body in question, causing the cylindrical body to vibrate. If the vortex shedding frequency is similar to the natural frequency of the cylindrical body, resonance occurs. For subsea pipelines, the amplitude of such vortex induced vibration can be a number of times the diameter of the pipeline.

For suppressing vortex induced vibration of subsea pipelines, it is known to provide subsea pipelines with so-called VIV suppression strakes. The expression of VIV suppression strakes typically refers to fins that are arranged on the outer surface of the pipe wall in a helical pattern. For arranging the fins on the outer surface of the pipe wall, strake fin support shells are arranged on the outer surface of the pipe wall from which shells the fins protrude. The shells are generally designed to cover half or a third of the peripheral surface of the pipeline along a certain length of the pipeline, such that two or three strake fin support shells can be arranged on the pipe wall to cover the full peripheral surface of a certain length of the pipeline. Straps are typically used for strapping the strake fin support shells to the pipeline.

The strake fin support shells are generally arranged on the outer surface of the pipe wall on board a pipe laying vessel during the process of laying a subsea pipeline on the seabed. Such pipe laying vessel has an onboard factory wherein lengths of pipe are welded head to tail thereby increasing the length of the pipeline. After welding a length of pipe to the vessel end of the pipeline, the pipeline is moved toward the seabed in order to make room on board for a subsequent length of pipe to be welded to the vessel end of the pipeline. On board the vessel, the pipeline is moveable supported on rollers. For supporting the pipeline on board a so-called. S-lay vessel rollers are arranged on the factory deck and on a so called stinger frame. The stinger frame is a bend frame that supports the pipeline in a transition from a substantial horizontal orientation on the factory deck into a substantial vertical orientation in the water. After arranging strake fin support shells on the outer surface of the pipe wall along a certain length of the pipeline, the strake fin support shells and the fins arranged thereof have to pass rollers on which the pipeline is supported while the length of the pipeline concerned is being moved along the factory deck and the stinger into the water.

To be able to pass a roller, the fins are required to bend while passing the roller and rebound after passing the roller. In view thereof the fins are preferably engineered to be flexible. On the other hand, the strake fin support shell is preferably engineered to be stiff in order to prevent deformation of the strake fin support shell while passing a roller. Deformation of the strake fin support shell while passing a roller may for instance result in a wave pattern to be formed in the strake fin support shell. This phenomenon is known as roller wave and is undesirable.

Thus, whereas a strake fin is required to be flexible, the strake fin support shell on which the strake fin is arranged, is required to be stiff. As a result of these contradictory requirements of the strake fin and the strake fin support shell, providing a single VIV suppression strake product, i.e. a strake fin support shell having arranged thereon a strake fin, provides technical challenges. When the roller loads increase, i.e. when the weight of the pipeline increases, technical challenges increase in view of the fact that for withstanding the increased roller loads the strake fin is required to be more flexible while the strake fin support shell is required to be more stiff.

Here, the disclosures in US2005/201832, WO-2004/009949 and WO-2007/027087 are acknowledged to address some of the above considerations in somewhat similar configurations as the present disclosure.

However, the present invention has as one of its objectives to address the above technical challenges faced when providing a VIV suppression strake product.

Thereto the present invention provides a VIV suppression strake assembly as defined in appended independent assembly claim. The VIV suppression strake assembly according to the present invention comprises a strake fin support shell that is configured to be arranged against the outer surface of a section of pipe and at least one strake fin having a fin tip and a fin base. The strake fin support shell comprises an aperture that is configured for inserting the fin therein, and the fin is provided at the fin base with an anchor, which anchor is configured for engaging the fin support shell on the pipe side of the aperture.

In the VIV suppression assembly according to the invention the strake fin and the strake fin support shell are separate elements that each may be engineered to meet their own requirements. The strake fin may be engineered as a separate element to meet its flexibility requirements, whereas the strake fin support shell may be engineered as a separate element to meet its stiffness requirements. In particular, the strake fin and the strake fin support shell may advantageously be made of materials having different properties, i.e. a relatively stiff material may be used for providing the strake fin support shell whereas a relatively flexible material may be used for providing the strake fin. The attachment of the strake fin to the strake fin support shell in the assembly according to the invention by means of an aperture in the strake fin support shell that is configured for inserting the fin therein, and an anchor provided on the fin base that is configured for engaging the fin support shell on the pipe side of the aperture, does not require adhering or fastening the strake fin to strake fin support shell. The latter is advantageous in that assembling the VIV suppression strake assembly according to the present invention does not require an adhesion step or fastening step, thereby simplifying the assembly. Furthermore, technical challenges related to adhering and fastening the strake fin to strake fin support shell provided by two separate elements may be avoided. For instance adhering a strake fin assembly of a first material to a strake fin support shell of a second material that is different from the first material poses technical difficulties with respect to the compatibility between an adhesive and the materials of the strake fin and the strake fin support shell. In the assembly according to the invention, this is not an issue. Furthermore, fastening a strake fin assembly to a strake fin support shell by means of fasteners poses technical difficulties with respect to the compatibility of the fastener with the corrosive environment in which the VIV suppression strake product is used. Again, in the assembly according to the invention, this is not an issue. Thus the VIV suppression strake according to the present invention not only provides that the strake fin and the strake fin support shell may be embodied by separate elements, but also provides for an advantageous way of attaching the strake fin to the strake fin support shell, in particular without fasteners and adhesives. Further, according to the present disclosure, the aperture is a slot, which is dimensioned to allow the fin to be inserted in the slot from the pipe side of the slot with the fin tip leading until the fin base engages the shell, to achieved the effects, functionality and improvements disclosed herein below under reference to for example FIGS. 5-7.

Advantageous embodiments of the VIV suppression strake assembly according to the invention are defined in claims that depend on the appended independent assembly claim.

Preferably, the width of the slot is less than the combined thicknesses of the anchor at the fin base. Thereby it is achieved that the fin can not be easily pulled through the slot when large external pulling and/or shear forces are exerted by the stinger rollers on the strake fin. A combined width less than the size of the slot is by no means excluded and is also expected to work, but the fin could possibly be pulled out more easily, which is precisely a reason for not inserted fins into the shell from the outside.

The present invention further provides a strake fin support shell of or for a VIV suppression strake assembly according to the invention as described herein.

The present invention further provides a strake fin of or for a VIV suppression strake assembly according to the invention as described herein.

The present invention further provides a method for providing a VIV suppression strake product as defined in claim 15. The method according to the invention comprises, providing a strake fin support shell that is configured to be arranged against the outer surface of a section of pipe, the strake fin support shell comprising an aperture that is configured for inserting a strake fin therein, and providing at least one strake fin to be inserted in the aperture, the strake fin having a fin tip and a fin base, wherein the fin is provided at the fin base with an anchor. The method further comprises inserting the strake fin in de aperture such that, once inserted, the anchor at the strake fin base engages the fin support shell on the pipe side of the aperture and the strake fin tip protrudes on the opposite side of the aperture. In a preferred embodiment the strake fin and the strake fin support shell are provided by transporting the strake fin and the strake fin support shell to an assembling location; and the strake fin is inserted in the aperture of the strake fin support shell on the assembling location. By transporting the strake fin and the strake fin support shell to the assembling location in unassembled state, less transport volume is required relative to transporting the strake fin and the strake fin support shell in assembled state. Since as described herein above the attachment of the strake fin to the strake fin support shell in the assembly according to the invention does not require adhering or fastening the strake fin to strake fin support shell, the VIV suppression strake assembly according to the present invention can be quickly assembled in the assembly location.

The present invention further provides a method for providing a pipeline with a VIV suppression strake as defined in claim 17. The method for providing a pipeline with a VIV suppression strake according to the invention comprises providing a VIV suppression strake assembly according to the invention as described herein above and as defined in any of claims 1 to 14, and arranging the wake fin support shell with the strake fin inserted in the aperture of wake fin support shell on the outer surface of a pipe wall of the pipeline. Preferably, the method further comprises strapping the strake fin support shell on the pipe wall of the pipeline.

BRIEF DESCRIPTION OF THE FIGURES

The accompanying figures are used to schematically illustrate presently preferred non-limiting exemplary embodiments of the present invention. The above and other advantages of the features and objects of the invention will become more apparent and the invention will be better understood from the following detailed description when read in conjunction with the accompanying figures, in which:

FIG. 4 shows in side view the length of pipe of FIG. 3 with two of the VIV suppression strake assemblies removed away from the length of pipe;

FIG. 5 shows in perspective view one of the removed VIV suppression strake assemblies of FIG. 4;

FIG. 6 shows in in bottom view the VIV suppression strake assembly of FIG. 5;

DETAILED DESCRIPTION OF THE FIGURES

Figure 1:
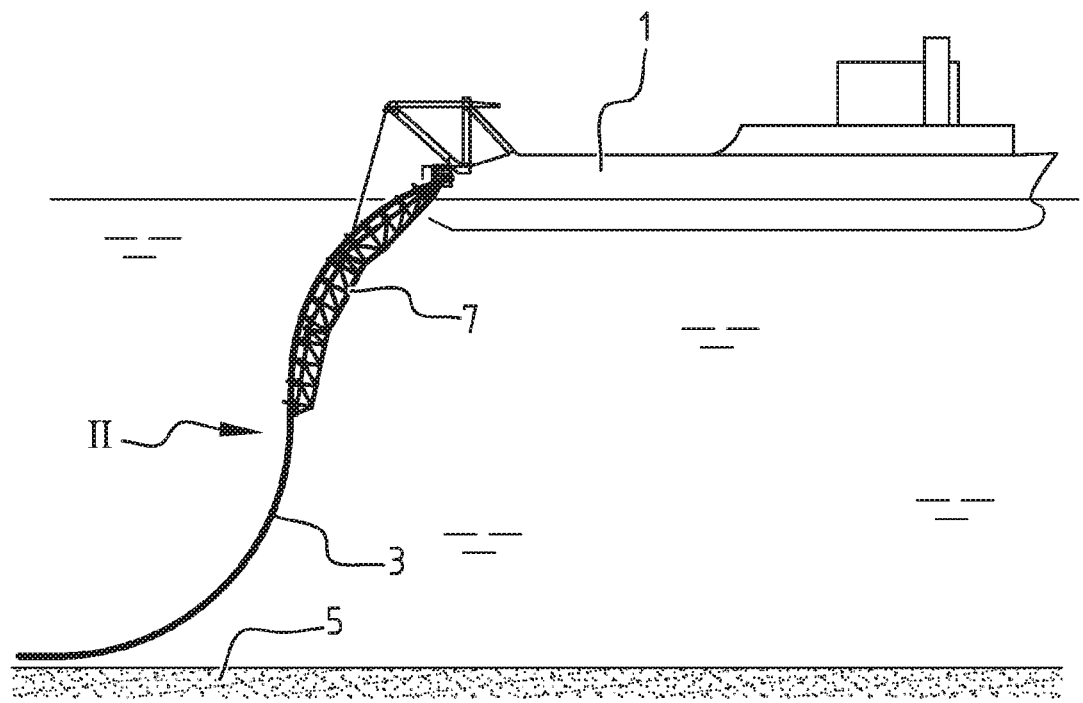
FIG. 1 shows in side view a pipe laying vessel laying a pipeline on the seabed.

In FIG. 1 a pipe laying vessel 1 is shown during the process of laying a pipeline 3 on the seabed 5. The pipe laying vessel 1 has an onboard factory wherein lengths of pipe are welded head to tail thereby increasing the length of the pipeline. After welding a length of pipe to the vessel end of the pipeline, the pipeline is moved toward the seabed in order to make room on board for a subsequent length of pipe to be welded to the vessel end of the pipeline. On board the vessel 1, the pipeline is moveable supported on rollers in a substantially horizontal orientation. For supporting the pipeline on board the vessel rollers are arranged on the factory deck and on a so called stinger frame 7 that in the embodiment of the pipe laying vessel shown in FIG. 1 is suspended from the stern of vessel 1. The stinger frame 7 is a bend frame that supports the pipeline 3 in a transition from the substantial horizontal orientation into a substantial vertical orientation. As shown in FIG. 1 the part of the pipeline 3 between the vessel end of the pipeline 3 and the seabed 5 has two bends in opposite directions, thereby forming an S-shape. This way of laying a pipeline on the seabed in therefore referred to as S-lay. Alternatively, the pipe laying vessel may be equipped with a factory wherein on board the vessel the vessel end of the pipeline is held in a vertical orientation. In this alternative way of pipe laying the part of the pipeline between the vessel end of the pipeline and the seabed has two bends in opposite directions, thereby forming a J-shape. This way of laying a pipeline on the seabed in therefore referred to as i-lay. Although the present invention is particularly advantageous in S-lay, the invention may also be applied in J-lay.

Figure 2:
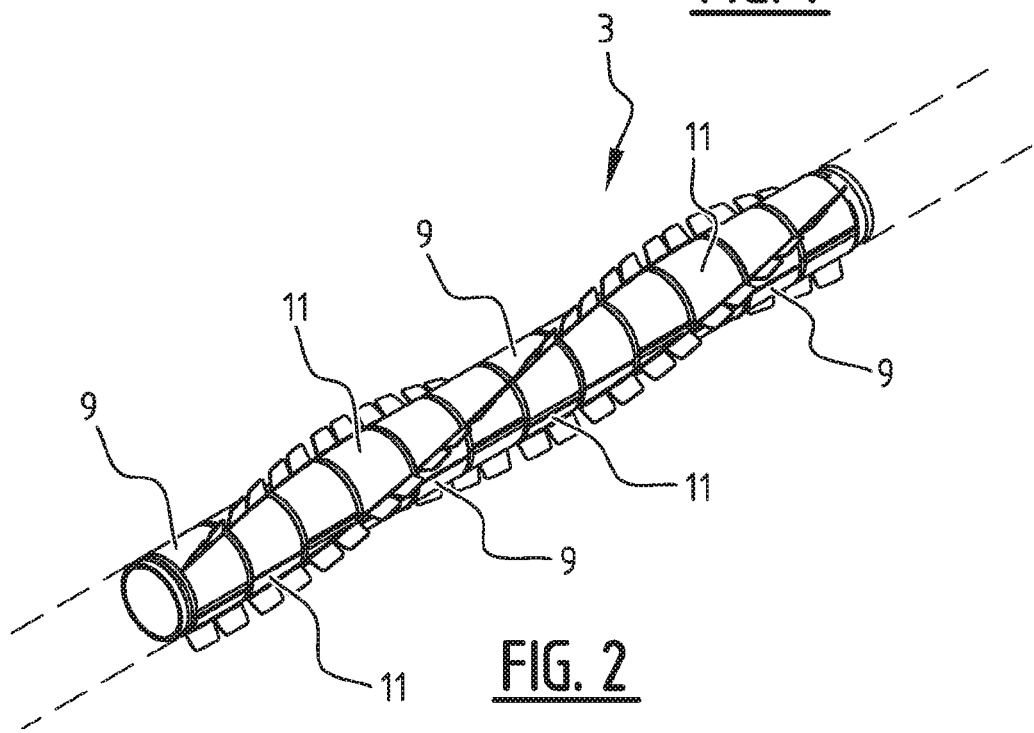
FIG. 2 shows in perspective view a length of the pipeline of FIG. 1 having a plurality of VIV suppression strake assemblies according to the invention arranged thereon.

In FIG. 2 a length of the pipe line 3 is shown. On the pipe wall of the shown length of pipe line 3 a plurality of VIV (Vortex Induced Vibration) strake assemblies 9, 11. The VIV suppression strake assemblies 9 provide the pipeline with three series 13a, 13b, 13c of strake fins 15, wherein the series 13a, 13b, 13c of strake fins 15 extend along three helical paths that are evenly distributed over the circumference of the pipe wall. The strake fins 15 protrude from the peripheral surface of the pipe wall and reduce vortex formation when the shown length of pipe line 3 is submerged in the water and exposed to currents.

Figure 3:
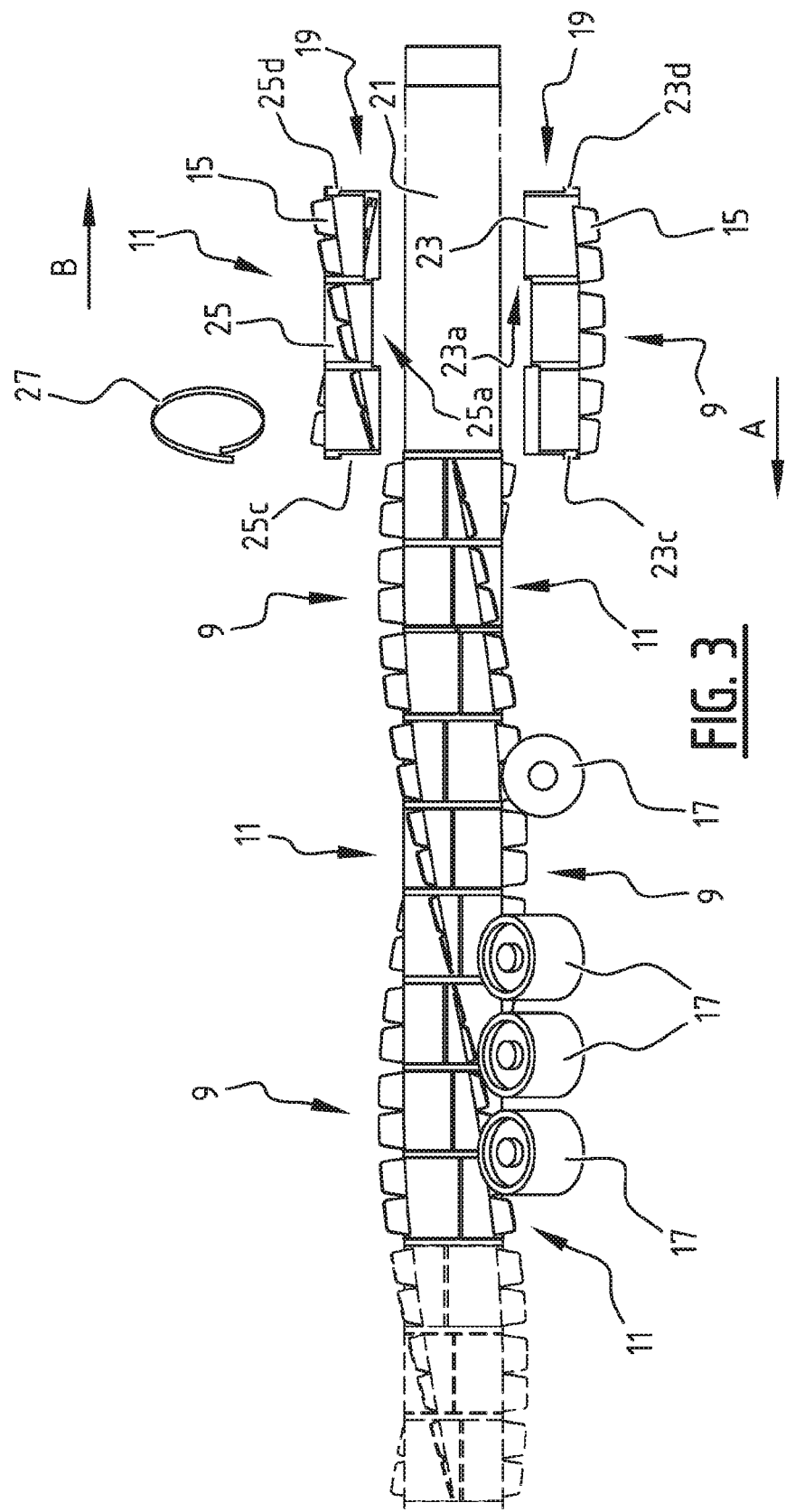
FIG. 3 shows in perspective view the length of pipe of FIG. 2 supported on rollers on board the pipe laying vessel of FIG. 1.

In FIG. 3 the length of pipeline 3 of FIG. 2 is shown on board the pipe laying vessel of FIG. 1. The length of pipe line 3 is supported by rollers 17. In FIG. 3 is shown that on board the pipe laying vessel a pair 19 of VIV suppression strake assemblies 9, 11 are about to be arranged on the pipe wall 21 of the pipeline. Each of the VIV suppression strake assemblies comprises a strake fin support shell 23, 25 and a plurality of strake fins 15 supported by and protruding from the strake fin support shell 23, 25. The strake fin support shells 23, 25 are each embodied by respective semicylindrical tube-shaped body. The strake fin support shells 23, 25 each have two have longitudinal edges 23a, 23b, 25a, 25b. When arranged on the pipe wall 21, the pairs of adjacent longitudinal edges 23a, 25a; 23b, 25b mate. The mating longitudinal edges 23a, 25a; 23b, 25b have complementary, in the shown embodiment interlocking shapes. In the shown embodiment the mating longitudinal edges 23a, 25a; 23b, 25b are stepped. Opposite longitudinal edges 23a, 23b; 25a, 25b of each of the pair of strake fin support shells 23, 25 are stepped in opposite directions, in particular such that one pair of mating longitudinal edges 23a, 25a lock movement of the fin support shell 23 relative to support shell 25 in one longitudinal direction of the pipeline indicated by arrow A, while the other pair of mating longitudinal edges 23b, 25b lock movement of the fin support shell 23 relative to support shell 25 in the other longitudinal direction of the pipeline indicated by arrow B. As a result, once both strake fin support shells 23, 25 are arranged on the pipe wall 21 and the mating longitudinal edges 23a, 25a; 23b, 25b are in a mated relationship, movement of the fin support shells 23, 25 the one relative to the other in both longitudinal directions of the pipeline is blocked. After arranging both strake fin support shells 23, 25 on the pipe wall 21 with the mating longitudinal edges 23a, 25a; 23b, 25b in a mated relationship, the strake fin support shells 23, 25 are bound together by means of at least one strap 27 that is arranged around both strake fin support shells 23, 25. The strake fin support shells 23, 25 differ from each other in that strake fin support shell 23 supports one of the three series of strake fins 15 whereas strake fin support shell 25 supports the other two of the three series of strake fins 15.

In FIGS. 3, 5 and 6 it is also shown that the face ends 23c, 23d, 25c, 25d of the strake fin support shells 23, 25 are also stepped. This stepped design of the face ends allow to interlock the face ends of adjacent strake fin support shells 23, 25. The stepped design of the longitudinal edges and the face ends of the strake fin support shells are advantageous, but may be omitted in certain applications.

As illustrated in FIG. 4, when passing the rollers, the strake fins 15 are bend by the rollers 17. See in particular the fin with reference sign 15a that passes the roller with reference sign 17a.

In FIGS. 5 and 6 is shown that the strake fin support shell 23 comprises a plurality of apertures embodied by elongated slots 29a to 29f. The elongated slots 29 extend through the strake fin support shell 9 and debouche both on the inner surface 31 and the outer surface 33 of the strake fin support shell 23. The inner surface 31 is arranged on the pipe wall 21. The side of the slots 29 where the slots 29 debouche on the inner surface 31 is also referred to as the pipe side of the apertures embodied by slots 29a to 29f. The side of the slots 29 where the slots 29 debouche on the outer surface 33 is also referred to as the fin side of the apertures embodied by slots 29a to 29f. The apertures embodied by slots 29a to 29f are each configured for inserting a strake fin 15 therein. In FIGS. 5 and 6 two of the slots 29a and 29b have no strake fin inserted therein, wherein each of the slots 29c, to 29f has a strake fin 15 inserted therein.

Figure 7A:
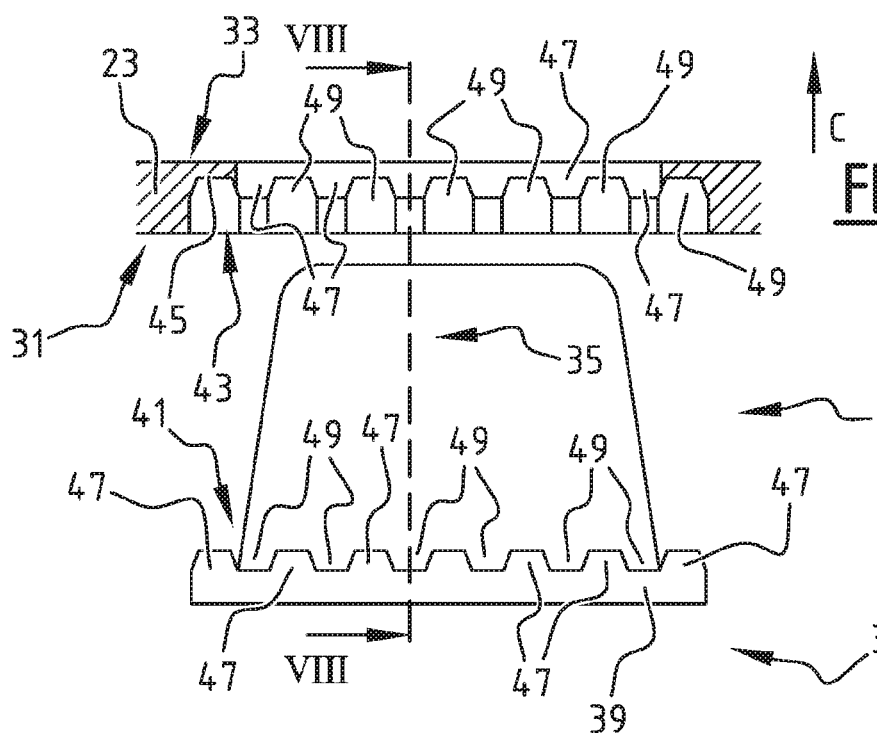
FIGS. 7A, 7B, and 7C show a section view of the VIV suppression strake assembly of FIG. 6 along a part of the section line indicated in FIG. 6, wherein the figures illustrate three situations during the process of inserting a strake fin in an aperture of a strake fin support shell of the VIV suppression strake assembly.
Figure 7B:
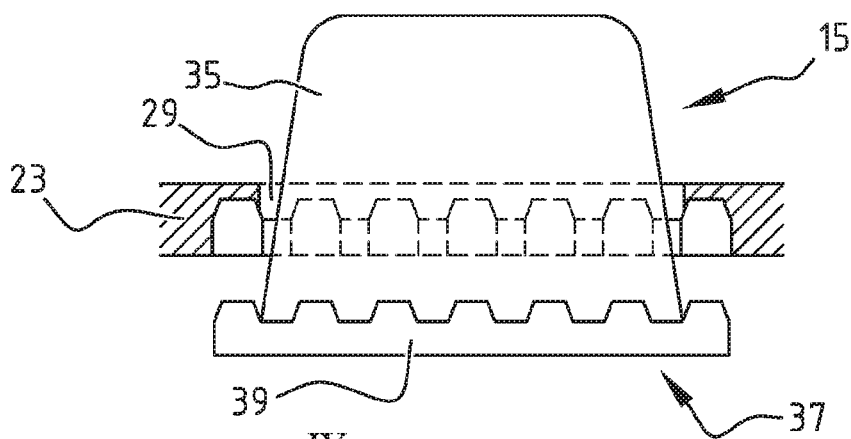
Figure 7C:
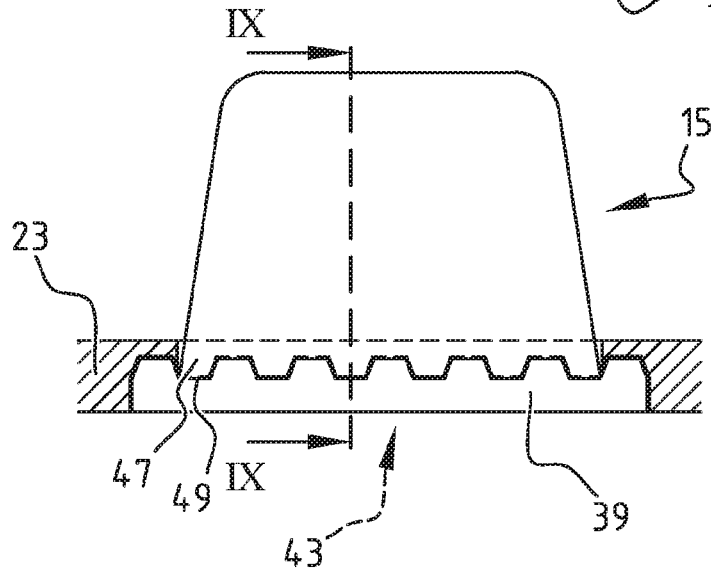

In FIGS. 7A to 7C the insertion of a strake fin 15 in a free slot 29 of the strake fin support shell 23 is illustrated. In FIG. 7A a strake fin 15 is shown while positioned on the pipe side of the slot 29. The strake fin 15 has a fin tip 35 and a fin base 37. In FIG. 7A the fin tip 35 points towards the slot 29. The strake fin 15 is dimensioned such that, as shown in FIG. 7B, the strake fin 15 can be inserted in the slot 29 with the fin tip 35 first. The strake fin 15 is provided at the fin base 37 with a anchor embodied by a peripheral flange 39. The peripheral flange 39 is configured for engaging the fin support shell 23 on the pipe side of the slot 29. The strake fin support shell 23 has on the pipe side of the slot 29 a seat embodied by peripheral recess 43 that extends around the slot 29 and that, as shown in FIG. 7C, is configured to accommodate the flange 39 therein. Once accommodated in the recess 43, the flange 39 prevents the strake fin 15 from moving relative to the strake fin support shell 23 in the direction of arrow C out of the slot 29. Furthermore, once the strake fin support shell 23 is arranged on the pipe wall 21, the strake fin 15 is prevented from moving relative to the strake fin support shell 23 in the direction of arrow D out of the slot 29. Consequently, once the strake fin support shell 23 is arranged on the pipe wall 21, the strake fin 15 is prevented from moving out of the slot 29.

In order to allow the strake fin 15 to be bend when passing a roller 17, as illustrated in FIG. 4, the strake fin 15 is designed to be flexible. The required flexibility may result in the fin base 37 that is accommodated in the seat 43 to deform under influence of the forces exerted on the fin tip 35 by the roller 17 while passing the roller. Such deformation may result in the strake fin 15 being damaged or even being pulled out of the slot 29. For increasing the resistance against forces exerted on the fin tip 35 by the roller 17 while passing the roller, the flange 39 and the recess 43 are dimensioned such that, as shown in FIG. 7C, once accommodated in the recess 43, the flange 39 is flush with the inner surface 31 of the strake fin support shell 23. This feature effective prevents the flange 39 from moving in the recess 43 under influence of forces exerted on the fin tip 35 by the roller 17 while passing the roller. In this context it is noted that the strake fin support shell 23 is firmly pressed against the pipe wall 21 by the roller 17 when the strake fin 15 supported by the strake fin support shell 23 passes the roller 17. This prevents the strake fin support shell 23 from being pulled away from the pipe wall 21 under influence of forces exerted on the fin tip 35 by the roller 17 while passing the roller, which may result in the recess 43 being moved away from the pipe wall 21 thereby allowing the flange 39 to move out of the recess 43. In an advantageous alternative embodiment, in stead of being flush with the inner surface 31 of the strake fin support shell 23 once accommodated in the recess 43, the flange 39 and the recess 43 may be dimensioned such that the flange has an oversize relative to the recess 43, in particular an oversize that results in the flange 39 to protrudes from the recess 43 once accommodated therein. In this alternative embodiment, the flange 39 is firmly clamped between the bottom surface 45 of the recess 43 and the pipe wall 21 when the strake fin support shell 23 is firmly pressed against the pipe wall 21 by the roller 17 while the strake fin 15 supported by the strake fin support shell 23 passes the roller 17.

In FIGS. 5, 6, and 7A-7C strake fin support shell 23 is shown. Strake fin support shell 25 corresponds to strake fin support shell 23, albeit that strake fin support shell 25 has two series of slots 29 for accommodating two series of strake fins.

As discussed herein above, for allowing the strake fin 15 to be bend when passing a roller 17, as illustrated in FIG. 4, the strake fin 15 is designed to be flexible. On the contrary, for preventing the strake fin support shells 23, 25 from being deformed under influence of the forces exerted thereon when passing the rollers 17, in particular for preventing so-called roller wave to occur, while at the same time effectively supporting the strake fins 15, the strake fin support shells 23, 25, are designed to be stiff. Since according to the invention, the strake fin 15 and the strake support shell 23, 25 are separate elements that are assembled into a VIV suppression strake fin assembly, the strake fin 15 and the strake fin support shell 23, 25 can be made of materials with different properties. The strake fin 15 can be made of a material that is engineered to have the flexibility that is required for the strake fin 15 to bend when passing the roller 19 and to rebound after passing the roller. At the same time, the strake fin support shell 23, 25 can be made of a material that is engineered to have the stiffness that is required for preventing roller wave and for effectively supporting the strake fin 15. In a preferred embodiment the strake fin support shell is made of a polyolefin, such as polypropylene. However, the strake fin support shell could for example also be made from a stiff Polyethylene (HDPE), and another material, such as for instance ABS, could also be suitable. In a preferred embodiment the strake fin is made of polyurethane, but, instead of polyurethane, a vulcanised elastomer, such as a rubber, or a plastomer (LLDPE block copolymer) could work very well. Other materials for the strake fin support shell and/or the strake fin may be less, equally or more suitable. The scope of the present disclosure is by no means limited to any specific material.

Furthermore, the attachment of the strake fin 15 to the strake fin support shell 23, 25 in accordance with the present invention does not require adhering or fastening the strake fin 15 to strake fin support shell 23, 25. The latter is advantageous in that assembling the VIV suppression strake assembly according to the present invention does not require an adhesion step or fastening step, thereby simplifying the assembly. Furthermore, the compatibility between an adhesive and the materials for the strake fin 15 and the strake fin support shell 23, 25 is not an issue in the engineering of the materials for the strake fin 15 and for the strake fin support shell 23, 25. Still further, since the attachment of the strake fin 15 to the strake fin support shell 23, 25 in accordance with the present invention does not require fasteners for fastening the strake fin 15 to the strake fin support shell 23, 25, the compatibility of the material of the fasteners with the environment in which the VIV suppression strakes are used is not an issue.

As shown in FIGS. 7A to 7C, the bottom surface 45 of the recess 43 and the upper surface 41 of the flange 39 that faces the bottom surface 45 of the recess 43, have complementary nesting shapes embodied by ridges, in particular parallel ridges 47, and valleys 49 extending between neighboring ridges. Once the flange 39 is accommodated in the recess 43, as shown in FIG. 7C, each ridge 47 mates with and nests in a valley 49. Mating ridges 47 and valleys 49 have complementary interlocking shapes. The ridges 47 and valleys 49 extend perpendicular to the longitudinal direction of the elongated slot 29. The ridges 47 and valleys 49 extending perpendicular to the longitudinal direction of the elongated slot 29 provide for distributed transfer of forces that act in the longitudinal direction of the slot 29 between the flange 39 and the recess 43 while the strake fin 15 passes a roller 17. The distributed transfer of such forces prevent excessive shear forces in the strake fin 15 at one end of the slot 29 that may result in the fin tip 35 being sheared off.

Figure 8:
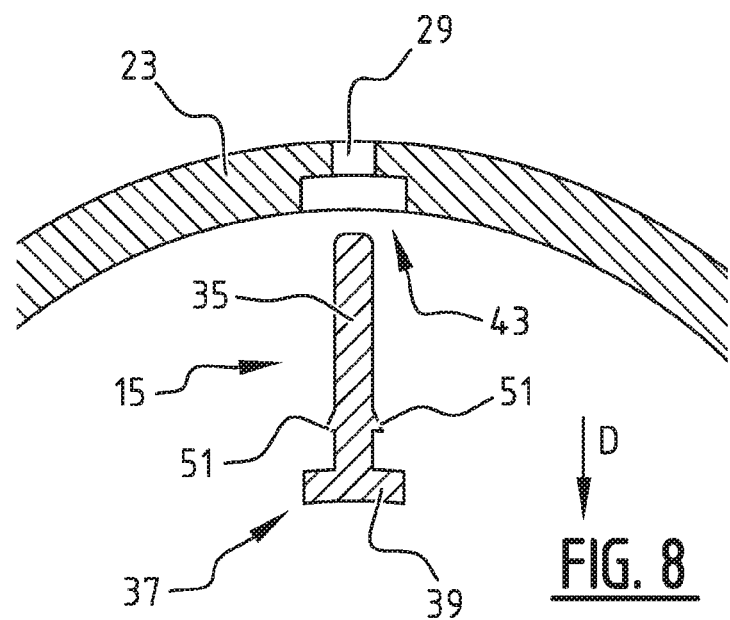
FIG. 8 shows a section view of the part of the VIV suppression strake assembly shown in FIG. 7A along a section line indicated in FIG. 7A.
Figure 9:
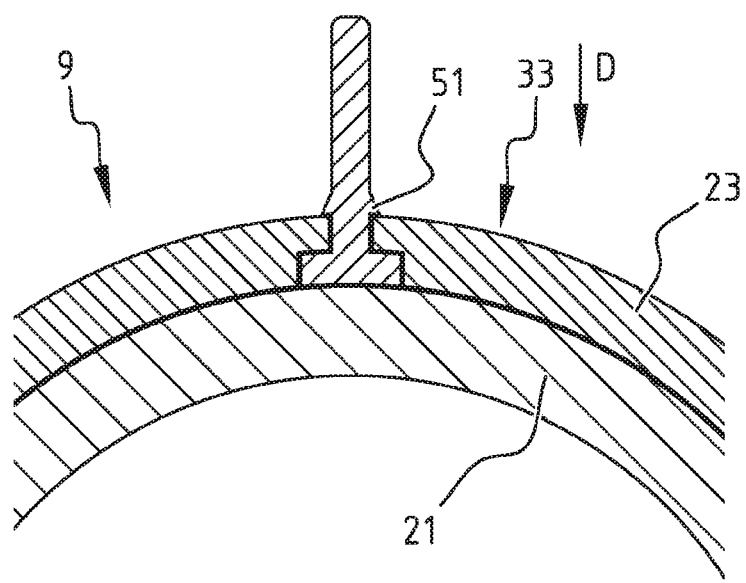
FIG. 9 shows a section view of the part of the VIV suppression strake assembly shown in FIG. 7C along a section line indicated in FIG. 7C, wherein the a strake fin support shell is arranged on a pipe wall.

In FIGS. 8 and 9 an alternative embodiment of strake fin 15 of FIGS. 7A to 7C is shown. The slot 29 and recess 43 of the strake fin support shell 23 correspond to the slot 29 and recess 43 of the strake fin support shell 23 of FIGS. 7A to 7C. The strake fin 115 corresponds to the strake fin 15, with a fin tip 35 and a flange 39 at the fin base 37, albeit that the fin tip 35 is provided with nose-like protrusions 51, once the strake fin 115 is inserted in the slot 29 and the flange 39 is accommodated in the recess 43 hooks, as shown in FIG. 9, on the periphery of the slot 29 where the slot 29 debouches on the outer surface 33 of the strake fin support shell 23. The nose-like protrusions prevent the strake fin 15 from moving out of the slot 29 in the direction of arrow D before the strake fin support shell 23 is arranged on the pipe wall 21. The nose-like protrusions are optional.

Figure 10:
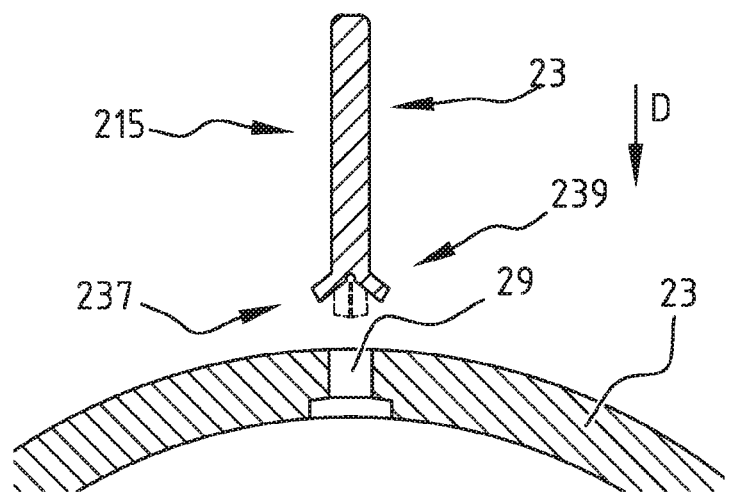
FIGS. 10 to 12 show an alternative embodiment of the strake fin of FIGS. 8 and 9 as well as an alternative way of insertion of the strake fin in the strake fin support shell.
Figure 11:
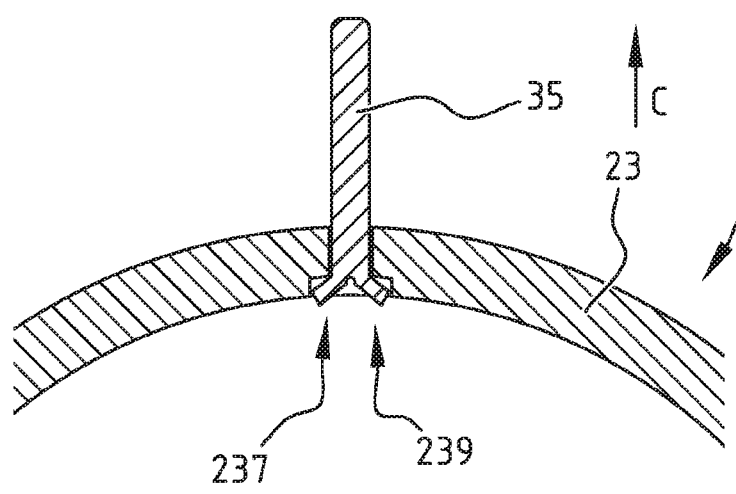
Figure 12:
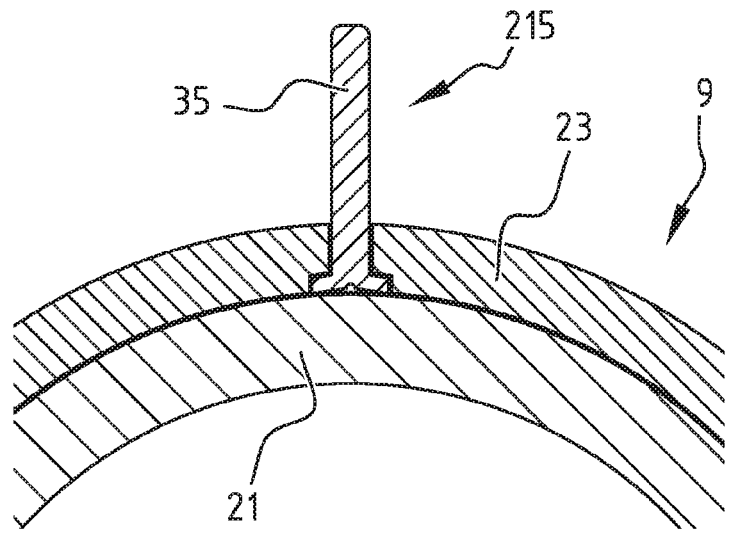

In FIGS. 10, 11, and 12 an further alternative embodiment of strake fin 15 of FIGS. 7A to 7C is shown. The slot 29 and recess 43 of the strake fin support shell 23 correspond to the slot 29 and recess 43 of the strake fin support shell 23 of FIGS. 7A to 7C. The strake fin 215 corresponds to the strake fin 15, with a fin tip 35 and a flange 239 at the fin base 37, albeit that, as illustrated, the flange 239 is designed to be deformed into an insertion state, in which state the flange 239 can be inserted in the slot from the fin side of the slot 29, i.e. the side opposite the pipe side, in the direction indicated by arrow D. This allows for the strake fin 215 to be inserted in the slot 29 with the fin base 137 first. Once the flange 239 reaches the recess 43, the flange 239 reforms into its original state, as shown in FIG. 11, thereby preventing the strake fin 215 to move out of the slot 29 in the direction of arrow C. As shown in FIG. 12, when the strake fin support shell 23 is arranged on the pipe wall 21, the flange 239 is deformed to conform to the recess 43, thereby additionally preventing the strake fin 215 to move out of the slot 29 in the direction of arrow C. In this context it is again noted that the strake fin support shell 23 is firmly pressed against the pipe wall 21 by the roller 17 when the strake fin 15 supported by the strake fin support shell 23 passes the roller 17. Thus when passing a roller 17, the force by means of which the flange 239 is deformed to conform to the recess 43 is increased, thereby increasing the resistance against the strake fin 215 to be pulled out of the slot 29 in the direction of arrow C under influence of the forces exerted on the fin tip 35 by the roller 17 while passing the roller.

In FIGS. 8 to 12 strake fin support shell 23 is shown. Strake fin support shell 25 corresponds to strake fin support shell 23, albeit that strake fin support shell 25 has two series of slots 29 for accommodating two series of strake fins.

In FIGS. 3, 5, and 6 the strake fin support shells 23, 25, are designed to cover half of the peripheral surface of the pipeline. Alternatively, the strake fin support shells 23, 25, may be designed to cover another part of the peripheral surface of the pipeline, in particular, but not limited to a third of the peripheral surface of the pipeline. In case the strake fin support shells would cover a third of the peripheral surface of the pipeline, three strake fin support shells are required to cover the full peripheral surface of the pipeline.

Although the principles of the invention have been set forth above with reference to specific embodiments, it must be understood that this description is given solely by way of example and not as limitation to the scope of protection, which is defined by the appended claims.

The invention claimed is:

1. A VIV suppression strake assembly, comprising:
    a semi-cylindrical, tube-shaped and stiff strake fin support shell that is configured to be arranged with a pipe side thereof against an outer surface of a section of pipe and prevent deformation of the strake fin support shell while passing supporting rollers; and
    at least one strake fin having a fin base and a fin tip that is flexible to be bent and deflected by supporting rollers;
    wherein:
    the strake fin support shell comprises an aperture that extends through the strake fin support shell and is configured for inserting the strake fin there through for the fin tip to protrude from the aperture away from a peripheral surface of the strake fin support shell opposite the pipe side;
    the strake fin is provided at the fin base with an anchor, which anchor is configured for engaging the fin support shell on the pipe side of the aperture,
    the slot is dimensioned to allow the fin to be inserted in and through the slot until the fin base engages the shell on the pipe side.

2. The VIV suppression strake assembly according to claim 1, wherein a width of the slot is less than the combined thicknesses of the anchor at the fin base.

3. The VIV suppression strake assembly according to claim 1, wherein:
    a stiffness of the strake fin support shell is greater than a stiffness of the strake fin.

4. The VIV suppression strake assembly according to claim 1, wherein:
    the strake fin support shell and the strake fin are made of materials having different properties.

5. The VIV suppression strake assembly according to claim 1, wherein:
    the strake fin support shell is made of a polyolefin.

6. The VIV suppression strake assembly according to claim 1, wherein:
    the strake fin is made of a material from a group comprising polyurethane, vulcanised elastomer, and a plastomer.

7. The VIV suppression strake assembly according to claim 1, wherein:
    the shell comprises on the pipe side of the aperture a seat for the anchor.

8. The VIV suppression strake assembly according to claim 7, wherein:
    the anchor and the seat have complementary nesting shapes.

9. The VIV suppression strake assembly according to claim 8, wherein:
    the complementary nesting shapes comprise interlocking shapes that are configured to lock movement of the anchor relative to the aperture in a direction along the exterior surface of the support shell.

10. The VIV suppression strake assembly according to claim 9, wherein:
    the aperture is a slot and the complementary nesting shapes comprise interlocking shapes that are configured to lock movement of the anchor relative to the aperture in the longitudinal direction of the slot.

11. The VIV suppression strake assembly according to claim 10, wherein:
    the interlocking shapes include ridges that extend perpendicular to the longitudinal direction of the slot.

12. The VIV suppression strake assembly according to claim 7, wherein:
    the seat comprises a recess in which the anchor is accommodated.

13. The VIV suppression strake assembly according to claim 12, wherein:
    the anchor and the recess are dimensioned such that the anchor is flush with the inner surface of the shell when the anchor is accommodated in the recess.

14. The VIV suppression strake assembly according to claim 7, wherein:
    the anchor and the seat are configured such that the anchor protrudes from the inner surface of the shell when the anchor is seated.

15. A strake fin support shell of or for a VIV suppression strake assembly:
    wherein the strake fin support shell is semi-cylindrical, tube-shaped and stiff and configured to be arranged with a pipe side thereof against an outer surface of a section of pipe to prevent deformation of the strake fin support shell while passing supporting rollers, and
    comprising an aperture that extends through the strake fin support shell and is configured for inserting a strake fin there through, for a flexible, bendable and deflectable fin tip of the strake fin to protrude from the aperture away from a peripheral surface of the strake fin support shell opposite the pipe side;
    wherein:
    the strake fin support shell is, on the pipe side of the aperture, configured to engage a fin base with an anchor of the strake fin,
    the aperture is a slot, and
    the slot is dimensioned to allow the fin to be inserted in and through the slot until the pipe side of the strake fin support shell engages the fin base with the anchor.

16. A strake fin of or for a VIV suppression strake assembly, wherein:
    the strake fin comprises a fin base provided with an anchor and a fin tip that is flexible to be bent and deflected by supporting rollers;

the anchor is configured to engage a semi-cylindrical, tube-shaped and stiff strake fin support shell on a pipe side of a slotted aperture extending through the strake fin support shell;

the strake fin is configured to protrude through the slotted aperture and to be inserted there through for the fin tip to protrude from the slotted aperture away from a peripheral surface of the strake fin support shell opposite the pipe side as the fin base provided with the anchor engages the shell on the pipe side.

17. A method for assembling a VIV suppression strake assembly, comprising:

providing a strake fin support shell that is configured to be arranged with a pipe side thereof against an outer surface of a section of pipe and is semi-cylindrical, tube-shaped and stiff to prevent deformation of the strake fin support shell while passing supporting rollers, the strake fin support shell comprising an aperture that extends through the strake fin support shell and is configured for inserting a strake fin therein, wherein the aperture is a slot;

providing at least one strake fin to be inserted in the aperture, the strake fin having a fin tip that is flexible to be bent and deflected by supporting rollers and a fin base, wherein the fin is provided at the fin base with an anchor;

inserting the strake fin in and through the slot such that, once inserted, the anchor at the fin base and the fin support shell on the pipe side of the aperture mutually engage and the strake fin tip protrudes from the aperture away from a peripheral surface of the strake fin support shell opposite the pipe side wherein the slot and the strake fin are correspondingly dimensioned.

18. The method for assembling a VIV suppression strake assembly according to claim 17, wherein:

the strake fin and the strake fin support shell are provided by transporting the strake fin and the strake fin support shell to an assembling location; and the strake fin is inserted in the aperture of the strake fin support shell on the assembling location.

19. A method for providing a pipeline with a VIV suppression strake, comprising:

providing a VIV suppression strake assembly according to claim 1; and arranging the strake fin support shell with the strake fin inserted in the aperture of the strake fin support shell on the outer surface of the section of pipe.

20. The method according to claim 19, further comprising:

strapping the strake fin support shell on the section of pipe.

* * * * *